E. C. FAHRNEY.
CURTAIN FOR MOTOR VEHICLES.
APPLICATION FILED JAN. 24, 1918.

1,316,834.

Patented Sept. 23, 1919.
2 SHEETS—SHEET 1.

WITNESSES
R. E. Rousseau

INVENTOR
Elmer C. Fahrney,
BY
ATTORNEYS

E. C. FAHRNEY.
CURTAIN FOR MOTOR VEHICLES.
APPLICATION FILED JAN. 24, 1918.
1,316,834.
Patented Sept. 23, 1919.
2 SHEETS—SHEET 2.
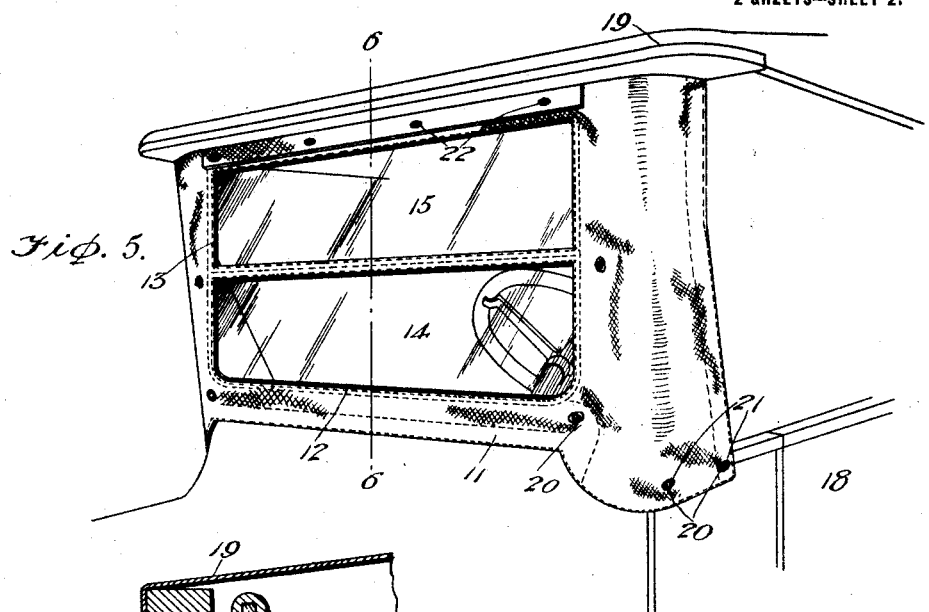
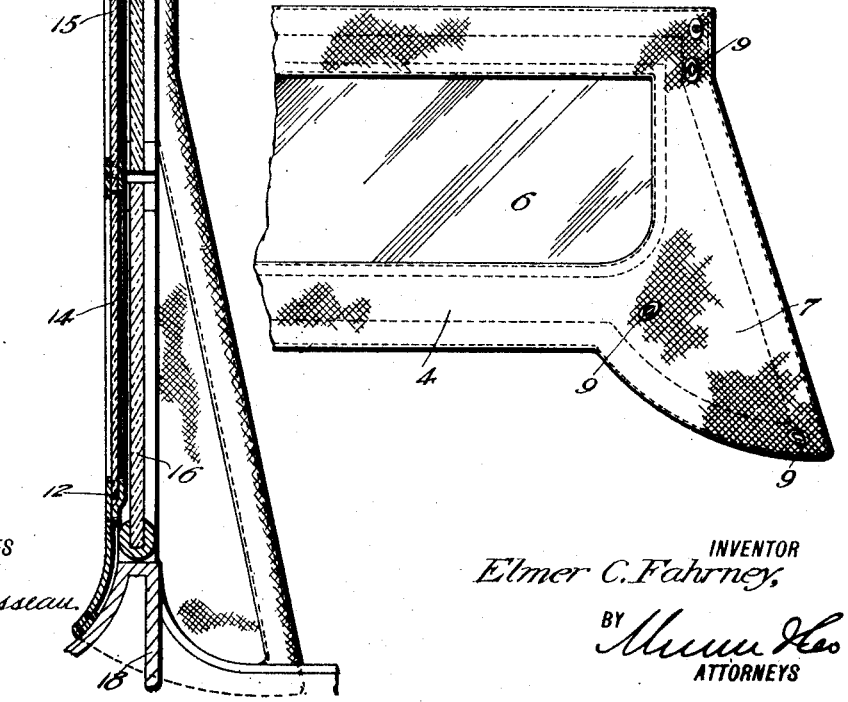
WITNESSES
R. E. Rousseau.
INVENTOR
Elmer C. Fahrney,
BY
ATTORNEYS

UNITED STATES PATENT OFFICE.

ELMER C. FAHRNEY, OF HAGERSTOWN, MARYLAND.

CURTAIN FOR MOTOR-VEHICLES.

1,316,834.	Specification of Letters Patent.	Patented Sept. 23, 1919.

Application filed January 24, 1918. Serial No. 213,579.

*To all whom it may concern:*

Be it known that I, ELMER C. FAHRNEY, a citizen of the United States, and a resident of Hagerstown, in the county of Washington and State of Maryland, have invented certain new and useful Improvements in Curtains for Motor-Vehicles, of which the following is a specification.

My invention is an improvement in curtains for motor vehicles, and has for its object to provide a curtain of the character specified adapted to be arranged at the wind shield to cover the space between the shield and its supports, and between the shield and the body of the vehicle, and between the sections of the shield to prevent the entrance of moisture at the front of the vehicle.

In the drawings:

Figure 1 is a perspective view of a motor vehicle with the curtain in place;

Figs. 2 and 3 are sections on the lines 2—2 and 3—3 of Fig. 1;

Fig. 4 is a perspective view of one end of the shield shown in Fig. 1;

Fig. 5 is a perspective view showing a modified form of curtain;

Fig. 6 is a section on the line 6—6 of Fig. 5.

Figure 1:
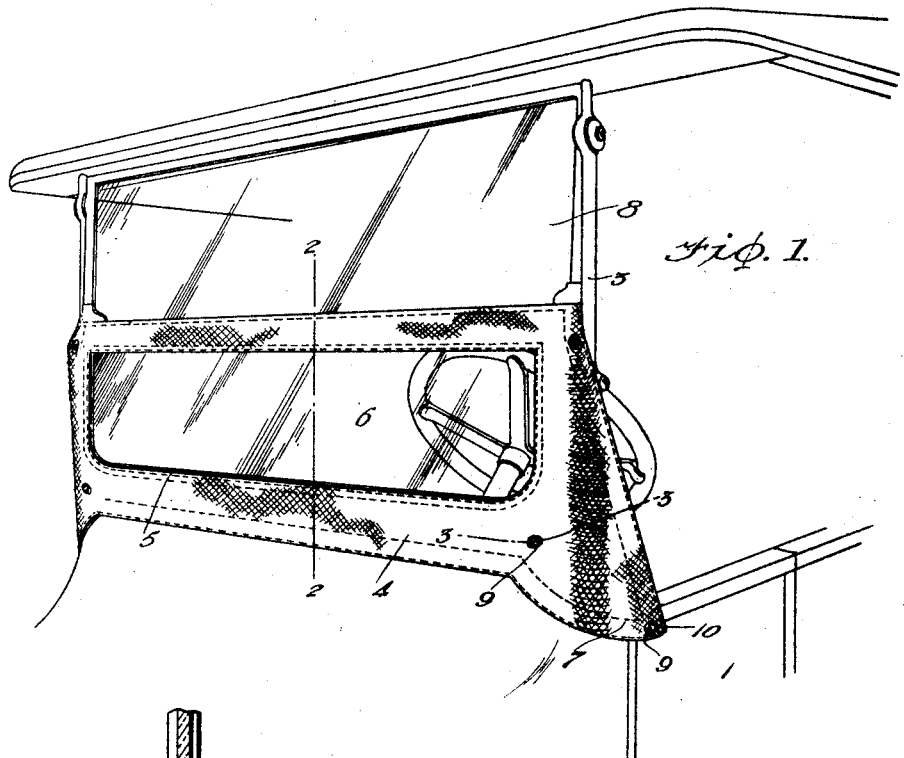

The embodiment of the invention shown in Figs. 1 to 4 is shown in connection with a motor vehicle 1, being arranged in front of the lower section 2 of the wind shield and being connected to the body 1 of the vehicle and to the supports 3 for the shield.

The curtain 4 has a longitudinally extending opening 5, in which is arranged a sheet 6 of transparent material, as, for instance, celluloid or the like, the said sheet being approximately the same size as the glass of the lower section of the shield. At each end the curtain has a downwardly and outwardly extending wing 7, and these wings are adapted to extend around the supports 3 and to connect with the body of the vehicle.

The curtain is arranged extending longitudinally of the lower section 2 of the shield, with the ends bent laterally backward to cover the space between the section and the supports 3 at each end of the shield. That portion of the curtain below the sheet 6 of transparent material covers the space between the wind shield section and the dashboard of the vehicle, so that no moisture can enter at the front, between the wind shield and its supports.

Figure 2:
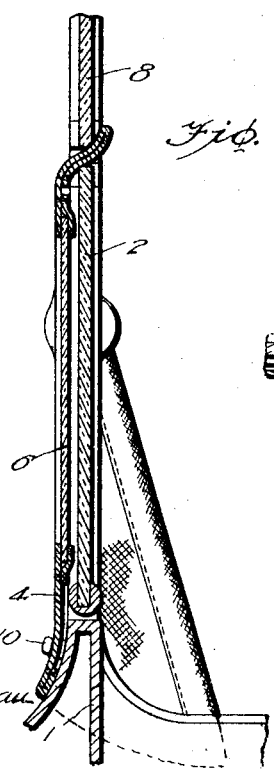
Figure 3:
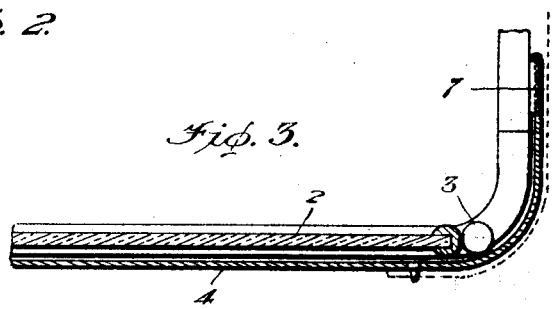

The upper edge of the shield may extend above the joint between the sections 2 and 8 of the wind shield or it may be passed between the sections, as shown in Fig. 2, to prevent the dripping of moisture down the outer face of the upper section between the curtain and the lower section.

The curtain is provided with buttonholes 9 for engagement by buttons 10 on the body of the vehicle and on the wind shield supports, three buttonholes and three buttons being provided at each end of the curtain in the present instance, one at each corner of the curtain and one at the apex of the wing. Other buttonholes and buttons may be provided if necessary. The sheet 6 of transparent material does not impede the view through the wind shield, while at the same time the curtain forms a protection against the entrance of moisture, and with the construction just described the upper section of the wind shield may be swung into any desired position without interfering with the operation of the curtain.

In the embodiment of the invention shown in Figs. 5 and 6, the curtain 11 has two openings 12 and 13 extending longitudinally thereof, the opening 13 being above the opening 12, and sheets 14 and 15 of transparent material are arranged in the openings. These sheets 14 and 15 are designed to register with the lower and upper sections 16 and 17, respectively, of the wind shield and the curtain is of a length to extend around the wind shield supports to connect with the body 18 and the top 19 of the vehicle and to close all of the space between the shield and its supports. The strip of curtain material between the openings 12 and 13 is at the point between the shield sections and covers the said point, and at this point the curtain may be folded downwardly, if desired, so that the upper section of the shield is left uncovered, the sheet 15 of the curtain registering with the sheet 14. The curtain 11 has buttonholes 20 which are adapted to engage buttons 21 on the body and on the wind shield supports, to hold the curtain in place. Other buttons 22 are provided on the top for engagement by buttonholes at the top of the curtain. It will be noticed that in both constructions the edges of the curtain are hemmed to reinforce and strengthen the same.

I claim:

A curtain of the character specified, comprising a substantially rectangular strip of fabric material having a longitudinally extending opening covered with a sheet of transparent material, said strip being adapted to be arranged outside of the lower section of a wind shield, and being of a width to extend below and above the said section, the strip having at each end an outwardly and downwardly extending wing for lapping around the ends of the wind shield supports to close the space between the said supports and the shield, said curtain having means for connecting it to the body and the supports.

Dr. ELMER C. FAHRNEY.

Witnesses:
Edward M. Tenney,
Alexander R. Hayne.

Copies of this patent may be obtained for five cents each, by addressing the "Commissioner of Patents, Washington, D. C."